United States Patent [19]

Burres

[11] 4,232,876
[45] Nov. 11, 1980

[54] GANG PLOW HITCH

[76] Inventor: John S. Burres, Box 375, Condon, Oreg. 97823

[21] Appl. No.: 10,594

[22] Filed: Feb. 8, 1979

[51] Int. Cl.³ .............................................. B62D 53/00
[52] U.S. Cl. ................................ 280/412; 280/411 C
[58] Field of Search ............... 280/411 R, 411 C, 412, 280/413, 456 R, 472, 462, 411 A, 411 B, 456 A, 463, 464, 467, 468; 172/314, 311, 312, 667

[56] References Cited

U.S. PATENT DOCUMENTS

| | | | |
|---|---|---|---|
| 2,136,550 | 11/1938 | Howard | 280/412 |
| 2,139,200 | 12/1938 | Moyer | 280/411 C |
| 2,955,848 | 10/1960 | Hyland | 280/411 C |
| 3,738,682 | 6/1973 | Ritter | 280/412 |

Primary Examiner—John J. Love
Assistant Examiner—Randall A. Schrecengost
Attorney, Agent, or Firm—Clarence A. O'Brien; Harvey B. Jacobson

[57] ABSTRACT

A rear universally supported gang plow mounting attachment is operatively connected to a forward horizontal transverse main header beam by a front to rear extending diagonal beam having its forward end pivotally anchored to one end of the header beam for angular displacement about a vertical axis, the gang plow mounting attachment being universally coupled to the rear end of the diagonal beam. An adjustable length longitudinal beam is pivotally attached at its forward end to the other end portion of the main transverse header beam and pivotally anchored at its rear end to the diagonal beam centrally intermediate the opposite ends thereof by structure operative to adjustably shift the axis of relative angular displacement of the diagonal beam and longitudinal beam longitudinally of the diagonal beam. The main header beam is further inclusive of structure for pivotally anchoring the mounting beam of a forward gang plow thereto for angular displacement about an axis generally paralleling the header beam.

5 Claims, 8 Drawing Figures

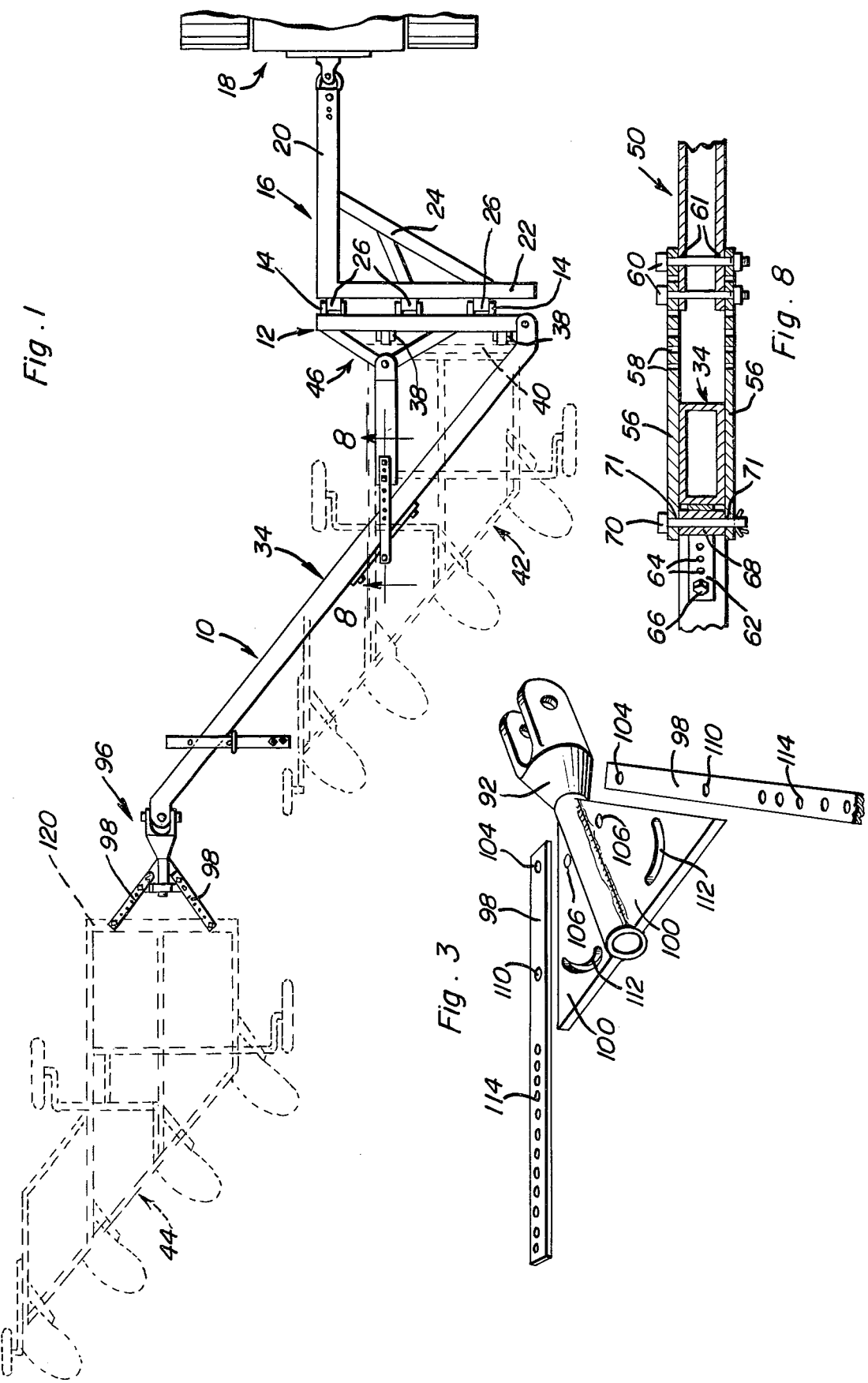

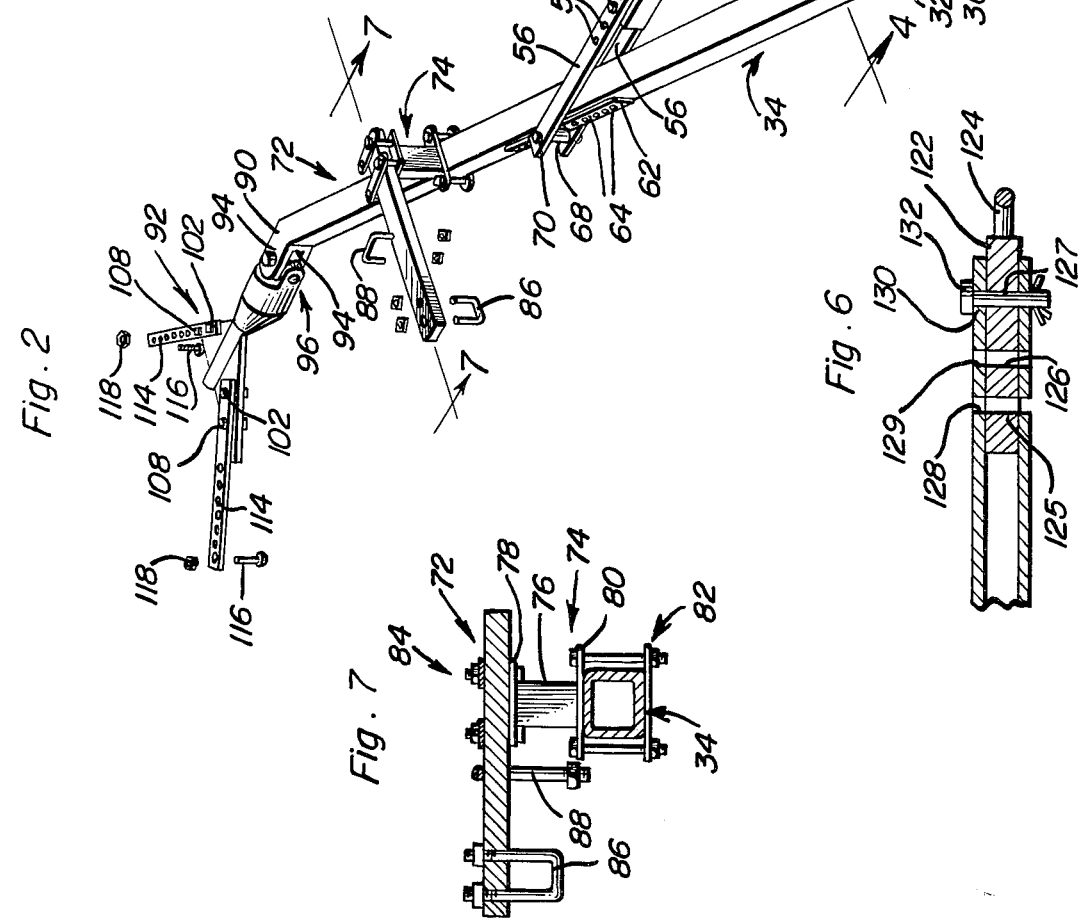

GANG PLOW HITCH

BACKGROUND OF THE INVENTION

1. Field of the Invention

Various forms of multiple gang plow hitches have been heretofore provided. However, some forms of multiple gang plow hitches are not adaptable for use when traversing inclined ground surfaces and/or are not constructed in a manner to allow relative up and down movement of the associated multiple gang plows while moving over uneven ground.

It is also pointed out that some known forms of multiple gang plow hitches are not constructed sufficiently rigid to withstand the strain placed thereon by pulling multiple gang plows. Still further, a majority of the previously known multiple gang plow hitches are not capable of imparting rearward thrust to the associated gang plows over sufficient distances to enable the gang plows to be "cleared", by backing up, of obstructions thereon.

2. Description of the Prior Art

Examples of various forms of gang plow hitches, including some of the general structural and operational features of the instant invention are disclosed in U.S. Pat. Nos. 2,060,196, 2,136,550, 3,239,014, 3,528,506, 3,731,748 and 3,965,989.

BRIEF DESCRIPTION OF THE INVENTION

The multiple gang plow hitch of the instant invention includes a forward transverse main header beam, a front to rear extending diagonal beam having its forward end pivotally attached to one end of the header beam, a longitudinal beam having its forward end pivotally anchored relative to the other end of the transverse header beam and its rear end anchored relative to a longitudinal midportion of the diagonal beam, structure universally supported from the rear end of the diagonal beam for attaching the front mounting beam of a rear gang plow to the hitch and structure being carried by the forward transverse header beam for pivotally attaching the forward transverse mounting beam of a forward gang plow thereto.

The hitch is constructed in a manner whereby it may be utilized to pull multiple gang plows across a slope and multiple gang plows anchored thereto may experience oscillation in relative elevation as well as roll and pitch movements. Further, the hitch is constructed in a manner whereby the multiple gang plows anchored relative thereto may be baked up for short distances in order to "clear" obstructions therefrom.

The main object of this invention is to provide a multiple gang plow hitch which may be utilized efficiently in conjunction with gang plows having different number of bottoms.

Another object of this invention is to provide a hitch constructed in a manner whereby the lateral offset of multiple gang plows operatively associated therewith may be adjusted as desired to achieve the proper amount of offset according to the number of plow bottoms provided on the gang plows.

Still another object of this invention is to provide a hitch including front and rear end portions for support from front and rear wheeled gang plow frames operatively associated therewith.

Another important object of this invention is to provide a gang plow hitch which may be readily adjusted according to the type of gang plows to be operatively associated therewith.

A final object of this invention to be specifically enumerated herein is to provide a gang plow hitch in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the gang plow hitch of the instant invention with a pair of gang plows in operative association therewith illustrated in phantom lines and the forward end of the hitch secured to a tractor hitch bar;

FIG. 2 is a perspective view of the gang plow hitch;

FIG. 3 is an exploded, perspective view of a universal attachment carried by the rear end of the main diagonal beam of the plow hitch and adapted for anchoring the forward mounting beam of a rear multiple bottom gang plow to the rear end of the diagonal beam;

FIG. 4 is an enlarged, transverse, vertical sectional view taken substantially upon the plane indicated by the section line 4—4 of FIG. 2;

FIG. 5 is an enlarged, vertical, longitudinal sectional view taken substantially upon the plane indicated by the section line 5—5 of FIG. 2;

FIG. 6 is an enlarged, longitudinal, vertical sectional view taken substantially upon the plane indicated by the section line 6—6 of FIG. 2;

FIG. 7 is an enlarged, transverse, sectional view taken substantially upon the plane indicated by the section line 7—7 of FIG. 2; and FIG. 8 is an enlarged, longitudinal, vertical sectional view taken substantially upon the plane indicated by the section line 8—8 of FIG. 1.

BRIEF DESCRIPTION OF THE INVENTION

Referring now more specifically to the drawings, and to FIGS. 1 and 2 in particular, the numeral 10 generally designates the gang plow hitch of the instant invention including a forward transversely extending and horizontally disposed main header beam generally designated by the reference numeral 12. The main header beam 12 is provided with a plurality of pairs of forwardly projecting bifurcated lug portions 14 which are suitably apertured. An L-shaped tractor hitch bar generally designated by the reference numeral 16 is provided and is secured to the rear end of a crawler-type tractor generally designated by the reference numeral 18. The L-shaped tractor hitch bar includes a longitudinal beam 20 and a transversely extending beam 22. A diagonal brace 24 is secured between the beams 20 and 22 in any convenient manner to provide rigidity to the hitch bar 16. The rear edge of the transverse beam 22 has a plurality of apertured lugs 26 extending rearwardly therefrom and received between the pairs of lugs 14 carried by the header beam 12. A plurality of pivot pins 28 are utilized to pivotally secure corresponding sets of apertured lugs 14 and 26 together to pivotally secure the main header beam 12 to the transverse beam 22 for angular displacement about a horizontally disposed transverse axis generally paralleling the beams 12 and 22.

One end portion of the header beam 12 is provided with an apertured lug portion 28 received between the similarly apertured furcations 30 of the bifurcated end 32 of a diagonal longitudinal beam generally designated by the reference numeral 34. A pivot pins 36 is secured through the furcations 30 and the lug 28 to pivotally secure the forward end of the diagonal beam 34 to the corresponding end of the header beam 12 for angular displacement about a vertical axis. A plurality of pairs of rearwardly projecting apertured lugs 38 are formed on the rear edge of the header beam 12 and are adapted for pivotally anchoring the forward transversely extending mounting beam 40 of a forward multiple bottom gang plow 42 thereto for angular displacement about a horizontal transverse axis. It will be noted that the forward multiple bottom gang plow 42 and a rear multiple bottom gang plow referred to in general by the reference numeral 44 are each provided with four plow bottoms.

A rearwardly projecting V-shaped frame is secured to the rear of the header beam 12 in any convenient manner and is suitably apertured at its apex. The forward bifurcated end 48 of an extensible longitudinally adjustment beam referred to in general by the reference numeral 50 is pivotally secured to the apex of the frame 46 by a pivot pin 52 passed through the furcation 54 of the bifurcated end 48 and the apex of the frame 46. The rear end of the longitudinal beam 50 is extensible and includes a pair of parallel connecting straps 56 each including a plurality of longitudinally spaced apertures formed therethrough for adjustable securement to the longitudinal beam 50 by means of fasteners 60 secured through selected apertures 58 and similar apertures 61 formed through the rear end of the beam 50.

Secured to an intermediate portion of the main diagonal beam 34 is an adjustable plate 62 which is suitably apertured as at 64 for adjustable securement to the diagonal beam 34 by means of fasteners 66 in positions faced longitudinally along the beam 34. The plate 62 has a vertically extending journal 68 anchored relative thereto which receives a pivot pin 70 therethrough and the pivot pin 70 is passed through vertically registered bores 71 formed in the rear ends of the straps 56.

It may thus be seen that the angular relationship of the main diagonal beam 34 relative to the header beam 12 may be adjusted by either longitudinally adjusting the straps 56 on the longitudinal beam 50 by means of the fasteners 60, or by longitudinally adjusting the position of the plate 62 along the main diagonal beam 34 by means of the fasteners 66. With particular reference to FIG. 1 of the drawings, it will be noted that when the included angle formed by the diagonal beam 34 and the header beam 12 is decreased, the rear multiple bottom gang plow 44 is offset a greater distance from the longitudinal center axis of the tractor 18. It would thus follow that when the included angle formed between the diagonal beam 34 and the header beam 12 is increased, the distance the gang plow is offset from the longitudinal center axis of the tractor 18 is reduced.

It will be noted that both the gang plows 42 and 44 are four bottom plows. If the plow hitch were to be used with five bottom plows, the included angle formed between the diagonal beam 34 and the header beam 12 would be reduced and if the plow hitch 10 were to be used with three bottom plows, the included angle formed by the diagonal beam 34 and the head beam 12 would be increased to provide the proper offset of the plow 44 relative to the plow 42. The angular relationship of the diagonal beam 34 relative to the main header beam 12 may be adjusted by either shortening the effective length of the longitudinal beam 50 or by moving the plate 52 longitudinally of the diagonal beam 34.

A jockey bar generally designated by the reference numeral 72 has one end portion fixedly secured to the diagonal beam 34 by means of a mounting assembly referred to in general by the reference numeral 74. The mounting assembly 74, with particular reference to FIG. 7 of the drawings, includes a spacer plate 76 having mounting plates 78 and 80 secured to the upper and lower ends thereof, respectively. The mounting plate 80 abuts the upper surface of the diagonal beam 34 and the mounting plate 78 abuts the undersurface of the jockey bar 72. A clamp assembly generally referred to by the reference numeral 82 clamps the mounting plate 80 to the diagonal beam 34 and a clamping assembly generally designated by the reference numeral 84 clamps the mounting plate 78 to the jockey bar 72. The free end of the jockey bar 72 is provided with a plurality of U-shaped clamping brackets 86 and 88 which are adapted for securement to the rear end of the multiple bottom plow 42, see FIG. 1.

The rear end of the diagonal beam 34 is bifurcated as at 90 and the forward end of an elongated mounting attachment generally referred to by the reference numeral 92 is swivelly anchored relative to the furcations 94 by means of a universal generally designated by the reference numeral 96. A pair of mounting arms 98 include forward ends pivotally secured to plates 100 carried by and projecting outwardly of opposite sides of the rear end of the mounting attachment 92 by means of pivot bolts 102 secured through aligned apertures 104 formed in the arms 98 and 106 formed in the plates 100. Adjusted rotated positions of the arms 98 relative to the plates 100 may be maintained by fasteners 108 secured through apertures 110 in the arms 98 and arcuate slots 112 formed in the plates 100 with which the apertures 100 are registered.

The rear end portions of the mounting arms 98 are provided with apertures 114 formed therethrough at points spaced longitudinally therealong and mounting bolts 116 may be secured through selected apertures 114 in order to securely anchor the forward transversely extending mounting beam 120 of the rear multiple bottom plow 44 to the mounting attachment 92.

The longitudinal beam 20 of the L-shaped tractor hitch bar 16 is provided with a sliding tongue 122 having an eye 124 secured to the forward end thereof for attachment to the tractor 18. The tongue 122 is slidably disposed in the forward end of the longitudinal beam 20 and is suitably apertured as at 125, 126 and 127. The longitudinal beam 20 is similarly apertured as at 128, 129 and 130. Aligned apertures 125 and 128 are adapted for receiving a shear pin ½" in diameter, the apertures 126 and 129 are adapted to receive a shear pin 9/16" in diameter and the apertures 127 and 130 are adapted to receive a shear pin 132 ⅝" in diameter. Of course, the shear pins of different diameters will break at different draw bar pulls of the tractor 18 and may be utilized to set a limit of the pull which the hitch 10 is adapted to handle.

It will be noted that the multiple bottom plow 42 is secured to the header beam 12 at two points spaced longitudinally therealong and that the rear end of the plow 42 is secured to the jockey beam 72. Thus, the plow hitch 10 is supported at three points. Further, it is to be understood that the plow hitch 10 is suspended beneath the frame structure of the forward multiple bottom plow 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A gang plow hitch for at least one pair of multiple bottom gang plows of the type including forward transverse mounting beams, said plow hitch including a longitudinal beam having front and rear ends, said front end being adapted for universal connection to a draft vehicle, the rear end of said longitudinal beam including a horizontal transverse header beam supported therefrom for angular displacement about a horizontal axis transverse to said longitudinal beam and generally paralleling said header beam, one end of said transverse header beam projecting outwardly to one side of said longitudinal beam and including longitudinally spaced anchor means for pivotally attaching the forward transverse mounting beam of a forward gang plow thereto for angular displacement about a first axis paralleling said transverse header beam, a main horizontal diagonal beam pivotally anchored at its forward end to said one end of said header beam and inclined toward its rear end outwardly beyond the other side of said longitudinal beam, an elongated horizontal adjustable length adjustment beam, anchor means pivotally anchoring one end of said adjustment beam relative to said header beam for angular displacement relative thereto about an upstanding axis spaced intermediate the opposite ends of said header beam, attaching means attaching the other end of said adjustment beam to said diagonal beam for adjustment therealong to maintain said adjustment beam in position substantially paralleling the direction of intended movement of said hitch throughout limited angular adjustment of said diagonal beam relative to said header beam, an elongated longitudinal short couple beam, means universally coupling the forward end of said short couple beam to said rear end of said diagonal beam, and the rear end of said short couple beam including mounting means for rigidly mounting the forward transverse mounting beam of a rear gang plow to said short couple beam rear end, said diagonal beam being of a length in relation to the angulation thereof relative to said header beam to properly laterally space the forward and rear gang plows operatively associated therewith said rear gang plow projecting laterally outwardly of the other side of said longitudinal beam.

2. The combination of claim 1 wherein said anchor means including a horizontally disposed rearwardly opening V-shaped frame whose apex portion projects rearwardly of said head beam, the forward end of said V-shaped frame being rigidly anchored relative to said header beam, the forward end of said adjustment beam being pivotally anchored to the rear apex portion of said V-shaped frame.

3. The combination of claim 1 wherein said mounting means includes a pair of rearwardly divergent opposite side mounting arms carried by the rear portion of said short couple beam and to whose rear ends the forward transverse mounting beam of said rear gang plow may be rigidly anchored.

4. The combination of claim 3 including means for variably adjusting the included angle defined by said mounting arms.

5. The combination of claim 1 including a transversely extending jockey bar carried by a rear portion of said diagonal beam and having a free end portion, said free end portion including means adapted for securement to the rear end of said forward multiple bottom gang plow.

* * * * *